Figures 5, 6:
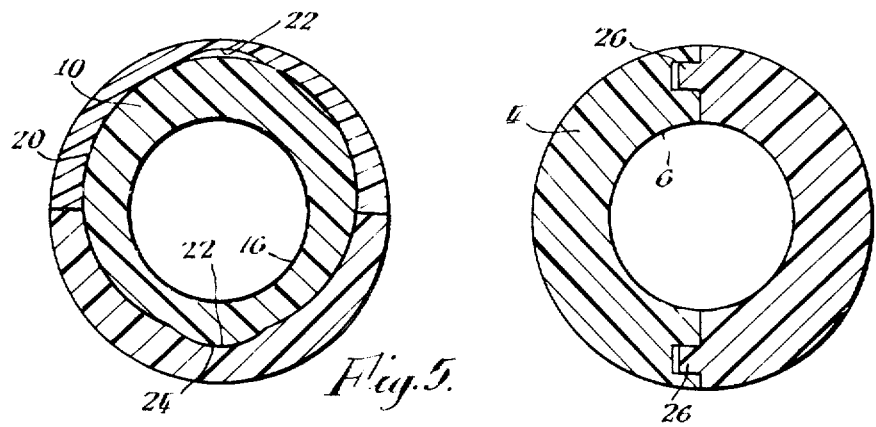

United States Patent [19]
Gamble

[11] 3,899,200
[45] Aug. 12, 1975

[54] FLUID CONDUITS

[75] Inventor: Kenneth H. Gamble, Rugeley, England

[73] Assignee: Scovill Manufacturing Company, Waterbury, Conn.

[22] Filed: Jan. 3, 1974

[21] Appl. No.: 430,588

[30] Foreign Application Priority Data
Jan. 5, 1973  United Kingdom.............. 792/73

[52] U.S. Cl................ 285/93; 285/178; 285/373; 285/374
[51] Int. Cl.²...................................... F16L 35/00
[58] Field of Search...... 403/350, 35 L; 287/DIG. 8; 285/178, 165, 39, 373, 419, 93, 374; 151/19 A

[56] References Cited
UNITED STATES PATENTS

| | | | |
|---|---|---|---|
| 1,214,985 | 2/1917 | Barber | 285/178 X |
| 1,405,342 | 1/1922 | Shaffer | 403/352 |
| 2,074,393 | 3/1937 | Hixon | 287/DIG. 8 |
| 3,075,792 | 1/1963 | Franck | 151/19 A X |
| 3,181,896 | 5/1965 | Russell | 285/387 X |
| 3,515,418 | 6/1970 | Nielsen | 403/352 X |
| 3,704,034 | 11/1972 | Shire | 285/178 X |

FOREIGN PATENTS OR APPLICATIONS

| | | | |
|---|---|---|---|
| 191,919 | 1/1923 | United Kingdom | 285/178 |

*Primary Examiner*—Dave W. Arola
*Attorney, Agent, or Firm*—Dallett Hoopes

[57] ABSTRACT

Conduit includes coupling having a cylindrical longitudinally-split outer member with a cylindrical opening therein and with a circular enlargement in the opening to receive a protrusion on an inner member eccentrically mounted in the outer member, the inner member also having a cylindrical opening. Openings in both members may be aligned or moved to eccentric positions upon relative rotation of the inner and outer members. Both members are held in a housing.

2 Claims, 10 Drawing Figures

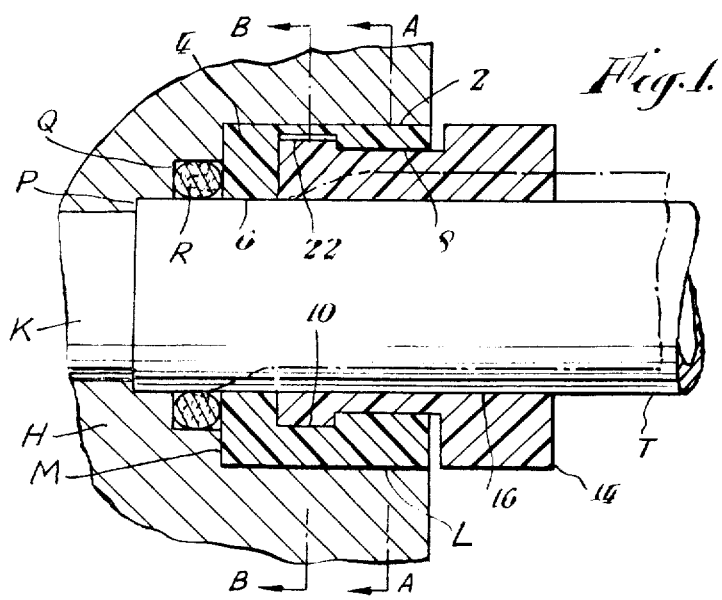
Fig. 1.
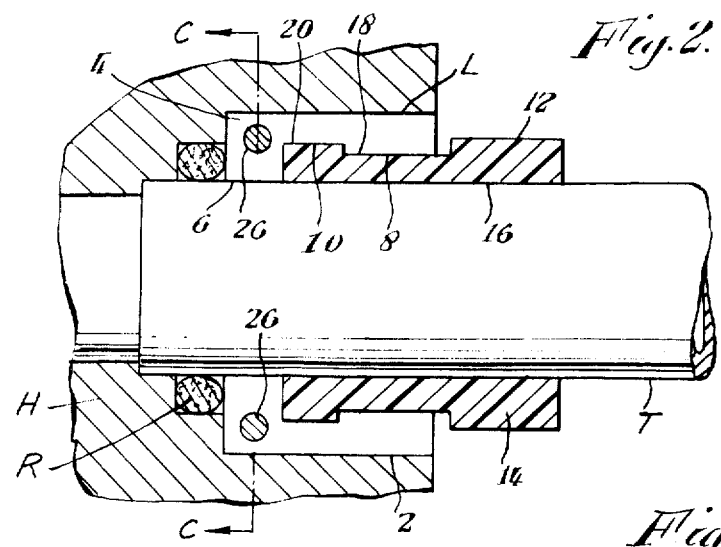
Fig. 2.
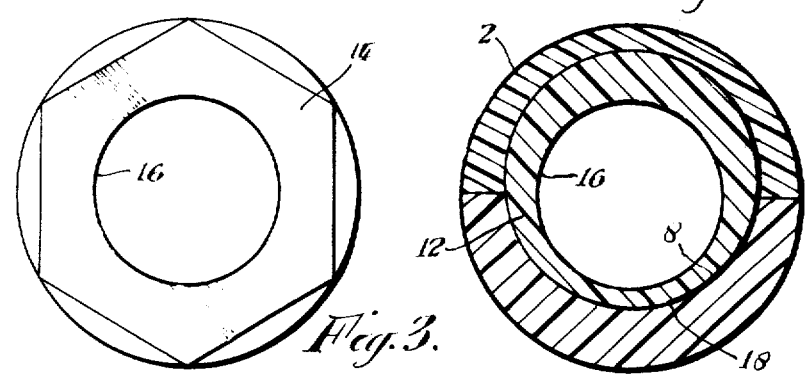
Fig. 4.
Fig. 3.

FLUID CONDUITS

This invention relates to couplings for fluid

According to the invention there is provided, for use with a tubular conduit, a coupling comprising inner and outer members having apertures or recesses providing engaging surfaces for the conduit, the members being relatively rotatable and having interengagement regions eccentric to at least one of said apertures or recesses whereby the tubular conduit can be gripped between the members by relative rotation of the members to cause relative lateral or radial displacement of the apertures or recesses of the respective members, at least one radially projecting retaining element on the inner member locating in a recess in the outer member and portions of said outer member recess limiting or preventing relative axial movement between the members, the outer member being formed in a plurality of parts permitting said location of the inner member within said recess on assembly.

In one form of the invention, the outer member comprises axially divided parts providing said recess so that the inner member is located and retained as the parts are brought together laterally. Dowels or spigots may be provided in the outer member for location of the axially split parts relative to each other on assembly with the inner member.

In another form of the invention, the outer member comprises a terminal part extending from said recess and securable to a contiguous part of the outer member after location of the inner member in said recess to maintain said retaining element of the inner member in said recess. Said terminal part is then conveniently in the form of a radially inner element engageable with an inner peripheral surface of said contiguous part extending from said recess.

Preferably, means are provided to indicate location of the members with the apertures or recesses at positions of maximum and/or minimum lateral or radial coincidence. It is also possible to arrange that said means or further means include elements that prevent movement of the members beyond said position or positions.

Figure 7:
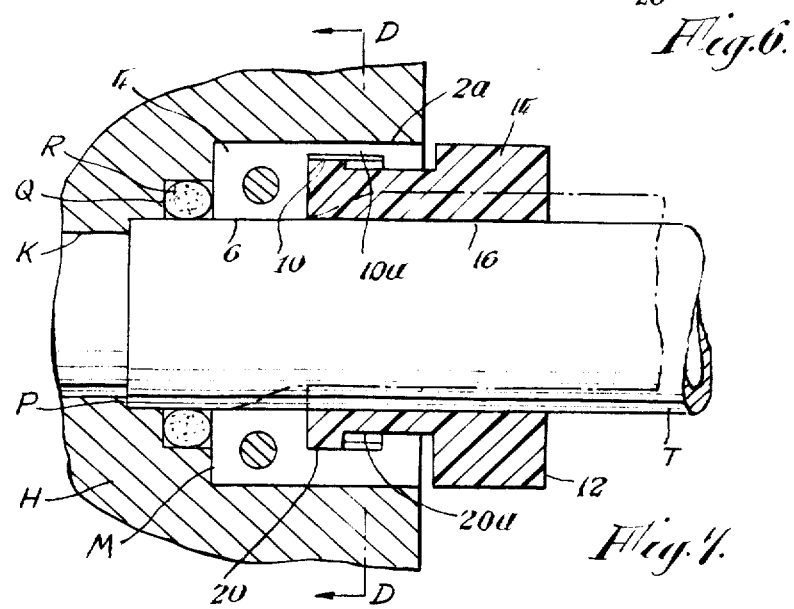
Figure 8:
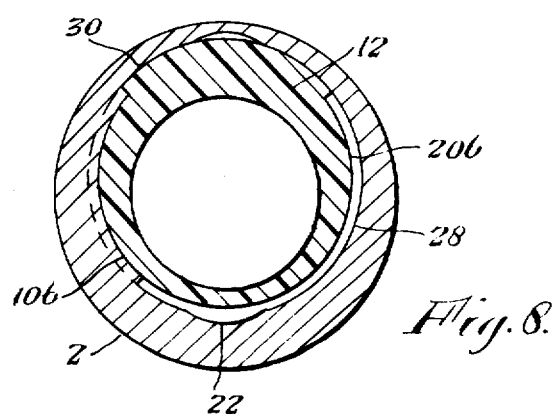
Figure 9:
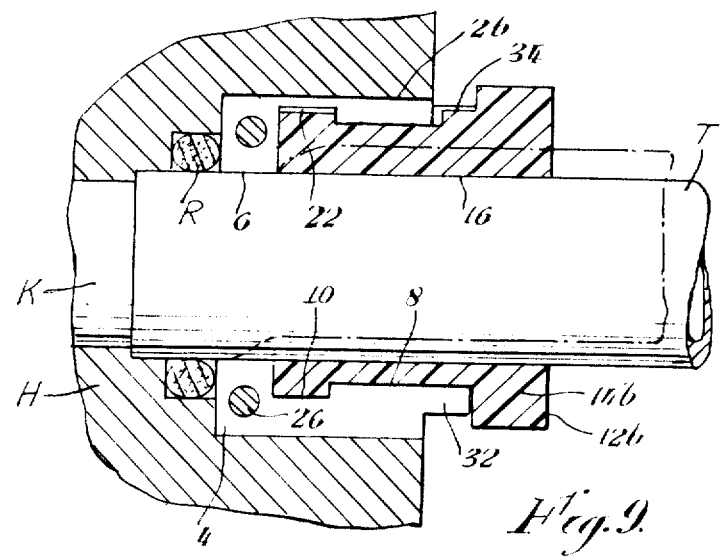
Figure 10:
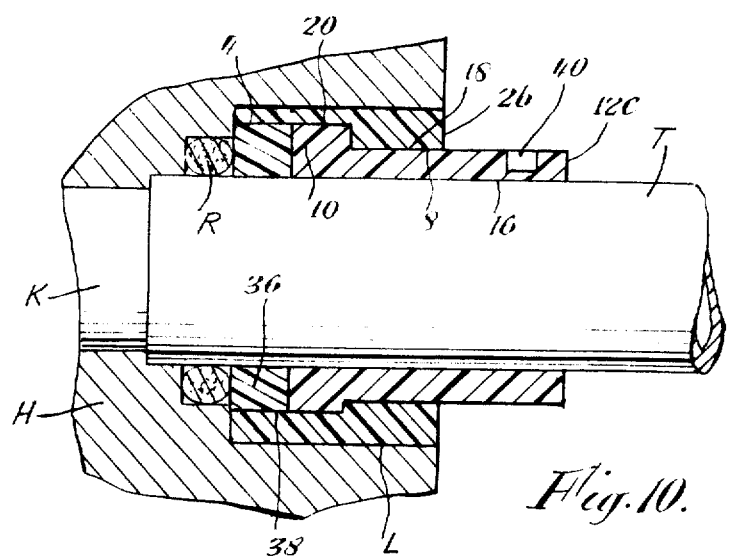

By way of example, the invention will be more particularly described with reference to the accompanying drawings, wherein:

FIGS. 1 and 2 are axial cross-sectional views, in mutually perpendicular planes, of a releasable coupling according to the invention, mounted in its housing, FIG. 3 is an end view of the coupling of FIGS. 1 and 2, FIGS. 4 to 6 are cross-sectional views of the coupling on the lines A—A and B—B in FIG. 1 and C—C in FIG. 2 respectively, FIG. 7 is an axial cross-sectional view of another releasable coupling according to the invention, mounted in its housing, FIG. 8 is a cross-sectional view of the coupling in FIG. 7 on the line D—D, and FIGS. 9 and 10 are axial cross-sectional views of two further releasable couplings according to the invention, mounted in their housings.

Referring more particularly to FIGS. 1 to 6, the coupling is shown releasably securing a flexible tubular conduit T, e.g. for a pressure air supply, to a housing H, which may, e.g. be part of a valve block, to couple the conduit to bore K in the housing. The coupling is itself a firm push-fit into a main counter-bore L of the housing and seats against shoulder M. Two further concentric shoulders P, Q are provided between the bore K and the counterbore L, the inner shoulder P providing an end stop for the insertion of the tubular conduit T and the outer shoulder Q providing a seating for an O-ring R that engages the conduit T to seal the bore K from the exterior.

The coupling comprises a hollow outer member 2 that has its cylindrical outer periphery engaging the counterbore L. At the axially inner end of the member 2 and bearing on the housing shoulder M is a flange 4 that has a bore 6 concentric with said outer periphery and within which the tubular conduit T is free sliding fit, the end face of the flange providing an enclosing surface for the O-ring R. At the other end of the outer member 2, the inner peripheral wall comprises a portion 8 that has a circular form eccentric to the bore 6 and an intermediate inner peripheral wall portion 10 between the bore 6 and the portion 8 has a similarly eccentric form but with a larger diameter.

The portions 8, 10 engage with a hollow inner member 12 of the coupling that comprises a hexagonal end flange 14 projecting proud of the outer member and concentric with a bore 16 through the inner member. Outer peripheral wall portions 18, 20 of the inner member are both eccentric to the bore 16 and register with the similarly eccentric portions 8, 10 of the outer member. The eccentricity or offset of each of the wall portions 8, 10, 18, 20 is the same.

It will be seen that, because of the presence of the eccentric portions, when there is relative rotation between the two members 2, 12, the bores 6 and 16 of the respective members will undergo relative radial displacement. These bores are illustrated in a position of axial coincidence but relative rotation through 180° will give a maximum relative radial displacement equal to twice the eccentricity or offset of the wall portions 8, 10, 18, 20.

As has already been indicated, the conduit T is a free fit in the bores 6, 16 and in operation, therefore, with these bores coincident the conduit can be inserted easily into the coupling to the position in which its inserted end is sealed by the O-ring R. Then by rotation of the inner member 12, the hexagon end flange 14 of which provides purchase for a tool, the bore 16 is displaced eccentrically and the conduit T is gripped firmly in place as it is deformed to the position shown in chain-dotted lines in FIG. 1, since it passes through the undisplaced bore 6 as well as the displaced bore 16. Return rotation of the member 12 releases the conduit again.

For convenience, positioning elements can be provided to facilitate the setting of the inner and outer members at alternative positions of axial coincidence and maximum eccentricity. In the embodiment of FIGS. 1 to 6, such elements comprise a pair of diametrically opposite recesses 22 (FIG. 5) in the inner peripheral wall portion 10 of the member 2 and a co-operating projection 24 on the outer peripheral wall portion 20 of the member 12. Such an arrangement is particularly suitable where the coupling parts are made from a relatively resilient material but it will be appreciated that other materials can be used and other forms of positioning then employed.

The location of the larger diameter portion 20 of the member 12 between the end flange 4 and portion 8 retains the members together preventing axial withdrawal of the inner member from the outer member. For initial assembly, however, the outer member 2 is made in two diametrically split parts and if these are themselves secured together, for example by peg and slot engagements 26 as is indicated in FIGS. 2 and 6 and with the assistance of a bonding agent if required, the coupling can be supplied as a preassembled unit before it is used.

Referring now to FIGS. 7 and 8, the releasable coupling shown here is similar in many respects to the embodiment already described, the illustrations in FIGS. 3, 4 and 6 being common to this second embodiment, and similar parts are indicated by the same reference numbers. A feature of this embodiment is the manner in which the intermediate portion of the inner peripheral wall of the outer member 2a has an intermediate section made up of two different, axially successive portions, so that in addition to the previously described portion 10 there is also a portion 10a, and the cooperating outer peripheral wall portion of the inner member 12a is made up similarly of different axially successive portions 20, 20a.

The portions 10, 20 have positioning elements 22, 24 as already described. FIG. 8 indicates, however, that in the portion 10a there is a part-annular recess 28 extending some 270° around the inner peripheral wall of the outer member and that a part-annular projection 30 of some 90° extent on the outer peripheral wall of the portion 20a of the inner member is located within this recess. The two members are thus able to rotate through a maximum of 180°, the projection and recess providing end stops limiting the movement: at each end position the element 24 will snap into one or other of the recesses 22 so holding the members in the chosen end position until it is required to release them.

The construction shown in FIG. 9 is also similar in many respects to that in FIGS. 1 to 6, the illustrations in FIGS. 3 to 5 being common to this further embodiment, and the same reference numbers are used for similar parts. In this embodiment of the invention, however, an end stop arrangement is provided at the axially outer end of the coupling.

For this purpose, outer member 2b has a part-annular axial projection 32 extending some 90° about the axis of the conduit. The under side of the hexagon head 14b of the inner member 12b has a similar 90° part-annular axial projection 34 extending towards the outer member 2b such that by relative rotation between the members the projections 32, 34 come into abutment, the total movement the opposite end positions determined thereby being 180°. The arrangement thus functions in a similar manner to movement limiting means formed by the recess 28 and projection 30 in the construction of FIGS. 7 and 8. Positioning elements 22, 24 are also provided in this construction in a similar manner to the two previously described constructions.

The outer member projection 32 is disposed concentrically to the eccentric inner peripheral wall portion 8 and its inner surface is a continuation of that wall. The projection 34 is radially coincident with the projection 32 and is also concentric to said inner wall portion 8. For convenience, the central axis of the hexagon head 14b is similarly disposed and covers both projections in all positions of adjustment.

The embodiment in FIG. 10 is also similar to the preceding illustrated examples in many respects but the outer member 2c now comprises a peripherally continuous main part providing the portions 8, 10 but the radially inner region of the end flange is made as a separate ring 36 secured to the main part of the outer member 2c only after the inner member 12 has been inserted in place. It will be appreciated that for ease of assembly the interface 38 between the ring 36 and the main part of the outer member has a diameter at least equal to that of the wall portion 20 of the inner member. To allow for passage through the bore 6 in the outer member, the axially outer end of the inner member has the same diameter as the portion 16 and apertures 40 are provided in the exposed and portion of the inner member for rotation of the member by a C-spanner.

Couplings in accordance with the invention can be constructed in a wide variety of materials as may be appropriate to the conditions of use and the fluid being handled. It will be appreciated moreover, that while both the illustrated embodiments show the coupling being used to connect a conduit to a block-form member, it can be used with a variety of known types of fittings, e.g. tee-pieces or other junction pieces, and the manner of attachment thereto can be varied from the simple push fit shown.

In addition many variations of the physical form of a coupling according to the invention are possible. For example, the invention can be applied to a female coupling, i.e. one which is inserted into the end of a tubular conduit. Also the inner and outer members need not always have the tubular or closed ring form of the illustrated examples since in the operative condition only parts of the circumferential extent of their peripheral walls engage the tubular conduit. It also follows from this that said walls need not be circular or part-circular in cross-section.

What we claim is:

1. For use with a tubular conduit, an assembly including a coupling comprising longitudinally aligned inner and outer members having apertures providing engaging surfaces for the conduit, the aperture in the inner member being a cylindrical, smooth, inwardly-facing surface, the members being both generally cylindrical and relatively rotatable and having interengagement regions eccentric to the axis of the members whereby the tubular conduit received into the apertures can be gripped between the members by relative rotation of the members to cause relative lateral displacement of the apertures of the respective members, at least one radially projecting retaining element on the inner member received into a recess in the outer member inhibiting relative axial movement between the members, the outer member being axially split and dowels and cooperative openings being provided in the split faces thereof to facilitate assembly; and housing means snugly and peripherally enclosing the outer member in press fit.

2. A coupling according to claim 1 wherein means are provided to indicate location of the members with the apertures at positions of maximum and minimum eccentricity or at a position of radial coincidence.

* * * * *